(12) United States Patent
Renaud et al.

(10) Patent No.: US 11,945,488 B2
(45) Date of Patent: Apr. 2, 2024

(54) CART EXTENDER

(71) Applicants: Henry Renaud, Jupiter, FL (US); John Petralito, Jupiter, FL (US)

(72) Inventors: Henry Renaud, Jupiter, FL (US); John Petralito, Jupiter, FL (US)

( * ) Notice: Subject to any disclaimer, the term of this patent is extended or adjusted under 35 U.S.C. 154(b) by 0 days.

(21) Appl. No.: 17/651,668

(22) Filed: Feb. 18, 2022

(65) Prior Publication Data
US 2022/0281503 A1   Sep. 8, 2022

Related U.S. Application Data

(60) Provisional application No. 63/155,900, filed on Mar. 3, 2021.

(51) Int. Cl.
*B62B 3/14*   (2006.01)
*B62B 3/02*   (2006.01)

(52) U.S. Cl.
CPC .............. *B62B 3/1464* (2013.01); *B62B 3/02* (2013.01)

(58) Field of Classification Search
CPC ......... B62B 3/1472; B62B 3/102; B62B 3/10; B62B 3/104; B62B 3/1464; B62B 1/26; B62B 1/262; B62B 5/00; B62B 3/02
See application file for complete search history.

(56) References Cited

U.S. PATENT DOCUMENTS

| | | | | |
|---|---|---|---|---|
| 2,676,710 A | * | 4/1954 | Williamson | B62B 1/262 |
| | | | | 280/DIG. 6 |
| 2,774,403 A | * | 12/1956 | Norman | B62B 1/262 |
| | | | | 280/DIG. 6 |
| 2,791,436 A | * | 5/1957 | Wuerthner | B62B 1/045 |
| | | | | 280/DIG. 6 |
| 5,390,788 A | * | 2/1995 | Schenkkan | A63B 55/53 |
| | | | | 206/315.6 |
| 6,641,147 B2 | * | 11/2003 | Werner | B62B 3/1472 |
| | | | | 280/47.35 |
| 7,192,035 B1 | * | 3/2007 | Lioce | B62B 3/1472 |
| | | | | 280/33.991 |
| 9,038,821 B2 | * | 5/2015 | Proulx | A63B 47/002 |
| | | | | 473/282 |
| 9,199,656 B1 | * | 12/2015 | Tong | B62B 3/18 |
| 9,290,195 B2 | * | 3/2016 | Olivier | B62B 3/102 |
| 11,185,180 B2 | * | 11/2021 | Albrecht | B62B 9/26 |
| 2004/0090047 A1 | * | 5/2004 | Kang | B62B 1/125 |
| | | | | 280/652 |
| 2006/0022005 A1 | * | 2/2006 | Chadwick | B62B 3/1468 |
| | | | | 224/411 |
| 2023/0025905 A1 | * | 1/2023 | Firpo | B62B 3/1468 |

* cited by examiner

*Primary Examiner* — James A Shriver, II
*Assistant Examiner* — Michael T. Walsh
(74) *Attorney, Agent, or Firm* — McHale & Slavin, P.A.

(57) ABSTRACT

A cart extender for use with a conventional shopping cart. The cart extender is formed from a six inch diameter base member having an angle sleeve attached to the distal end and an open end along a proximal end defining a chamber therebetween. The base is releasably secured to a conventional shopping cart using a hook member that rests on a lower rail of the shopping cart and a clasp member that secures to an upper rail. A telescopic ring member is secured to the base member in a retracted position and extendable outwardly therefrom to provide support to long items placed in the receptacle. The cart extender allows for the safe movement of long items such as rebar, corner bead, and the like within a shopping store.

8 Claims, 5 Drawing Sheets

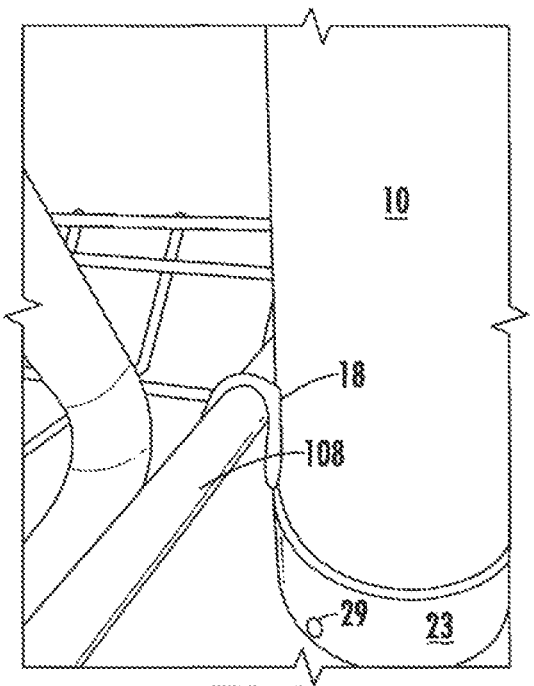 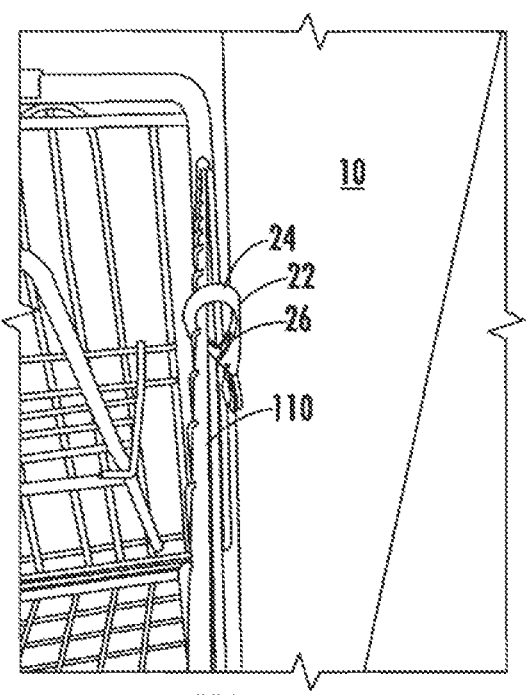

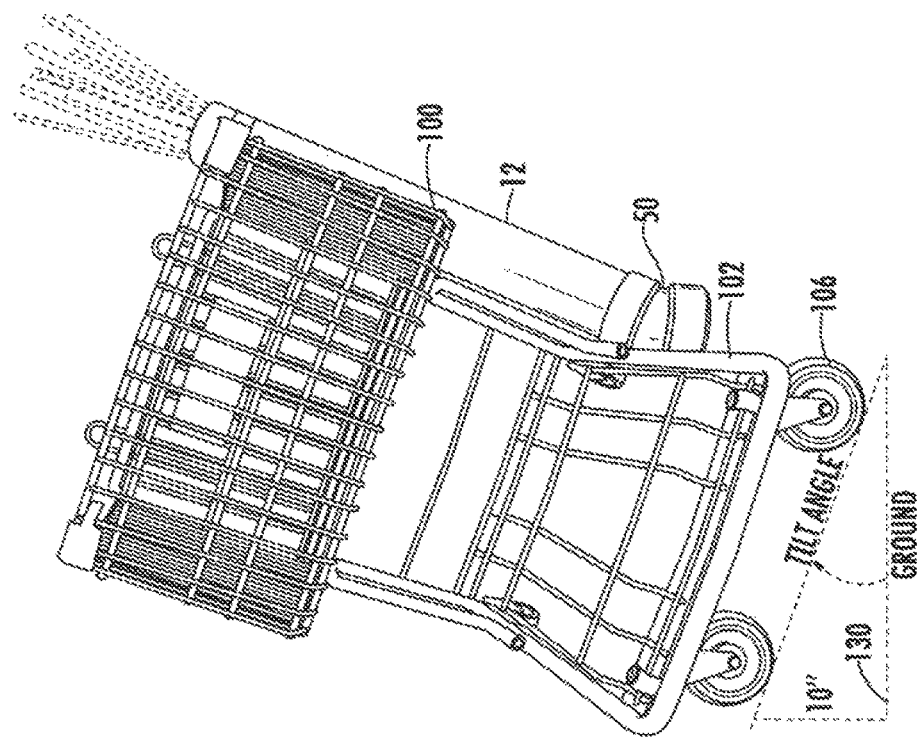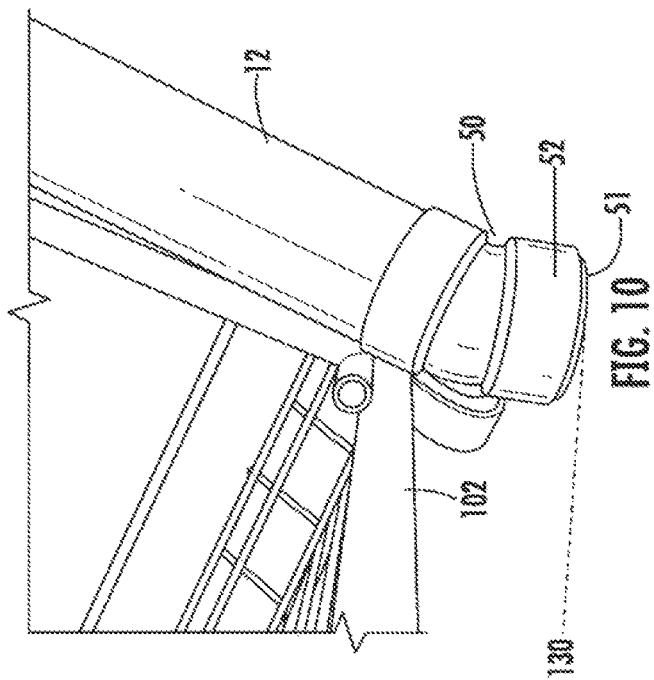

CART EXTENDER

PRIORITY CLAIM

In accordance with 37 C.F.R. 1.76, a claim of priority is included in an Application Data Sheet filed concurrently herewith. Accordingly, the present invention claims priority to U.S. Provisional Patent Application No. 63/155,900, entitled "CART EXTENDER", filed Mar. 3, 2021. The contents of the above referenced application is incorporated herein by reference in its entirety.

FIELD OF THE INVENTION

This invention is directed to the field of shopping carts and, in particular, to a shopping cart extender to transport long items.

BACKGROUND OF THE INVENTION

Shopping carts and wagons are used to carry items while shopping. Shopping carts are simply large baskets on wheels, and are commonly employed at grocery stores, big box building supply stores, and the like. While shopping carts come in various shapes and sizes, for illustration purposes, we will refer to a very large shopping cart capable of holding about 8 cubic feet of material with a basket length of about 45 inches. While a large cart is suitable for carrying items in the basket, the consumer at a building supply store is commonly carrying items larger than 45 inches. Longer items may be placed on a wagon, but the longer items will extend well beyond the wagon support platform. For example, a 2×4×8 piece of lumber will not fit in a shopping cart, but will readily fit on an open wagon.

A problem arises when a customer purchases items that are not properly supported by a shopping cart. For instance, an 8 foot length of drywall corner bead placed on either a shopping cart or a wagon can easily be damaged, as the corner bead is very thin and extends well beyond the length of the shopping cart or wagon. When the consumer attempts to move such items, the consumer must maneuver the wagon or cart through the store taking care to avoid hitting product shelves, as well as other customers. Striking an individual or product shelf with a 2×4 having a flat end is not likely to cause injury. However, striking anything or anyone with corner bead having sharp edges can irreversibly damage the bead, as well as cause a serious injury to another customer. Even if the bead is stationary on the wagon, a customer may accidently walk into the bead and the sharp edge can easily tear clothing or skin. Further, if the bead is damaged while in the store, the consumer will return the item and obtain a replacement, leaving the now damaged item with the store to deal with.

While a corner bead is used as an example, the same problem exists for copper tubing, plastic tubing, electrical conduit, steel rebar, molding, broom handles, and paint brush extension handles to name just a few items that do not fit into a shopping cart or be safely carried on a wagon.

What is needed in the industry is a cart extender that is removably attached to a conventional shopping cart for safely carrying long items in a vertical position.

SUMMARY OF THE INVENTION

Disclosed is a cart extender for use with a conventional shopping cart. The cart extender is formed from a tubular shaped base member having a length with a proximal end and a distal end. The proximal end forms an opening and distal end is capped closed, forming a receptacle. A hook member is secured to an outer surface of the base member along the distal end. The hook member is substantially U-shaped and arranged to rest over a lower rail of the shopping cart. The hook member operates in conjunction with a clasp member which is secured to an outer surface of the base member along the proximal end. The clasp member provides a positive securement to an upper rail of the shopping cart, fixing the base member to the shopping cart. A telescopic ring member is secured to the base member. The ring member is placed in a retracted position adjacent to the proximal end and extendable outwardly therefrom, wherein the ring member provides support to longer items placed in the receptacle. An angle sleeve can be attached to the distal end of the base member to prevent tipping of the shopping cart if the receptacle is overloaded with weight.

An objective of the invention is to teach the use of a receptacle for holding long items in a vertical profile to prevent contacting of product shelves and other customers otherwise occasioned when long items are transported in a horizontal plane.

Another objective of the invention is to provide a cart extender that is easily attached to any shopping cart having two points of contact, and can be removed from the shopping cart without tools.

Still another objective of the invention is to provide a cart extender having a telescopic extension holder to support long items extending from the cart extender receptacle.

Yet another objective of the invention is to provide an angle sleeve to prevent tipping of the shopping cart if the cart extender is overloaded.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

BRIEF DESCRIPTION OF THE DRAWINGS

FIG. A is a perspective view of the device attached to a shopping cart with the ring member retracted;

FIG. 6 is a perspective view of a hook member;

FIG. 7 is a perspective view of a clasp member;

FIG. 10 is a perspective view of the angle sleeve; and

FIG. 11 is a perspective view of the shopping cart with the angle sleeve resting on the ground.

DETAILED DESCRIPTION OF THE PREFERRED EMBODIMENT

Detailed embodiments of the instant invention are disclosed herein; however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

Figure 1A:
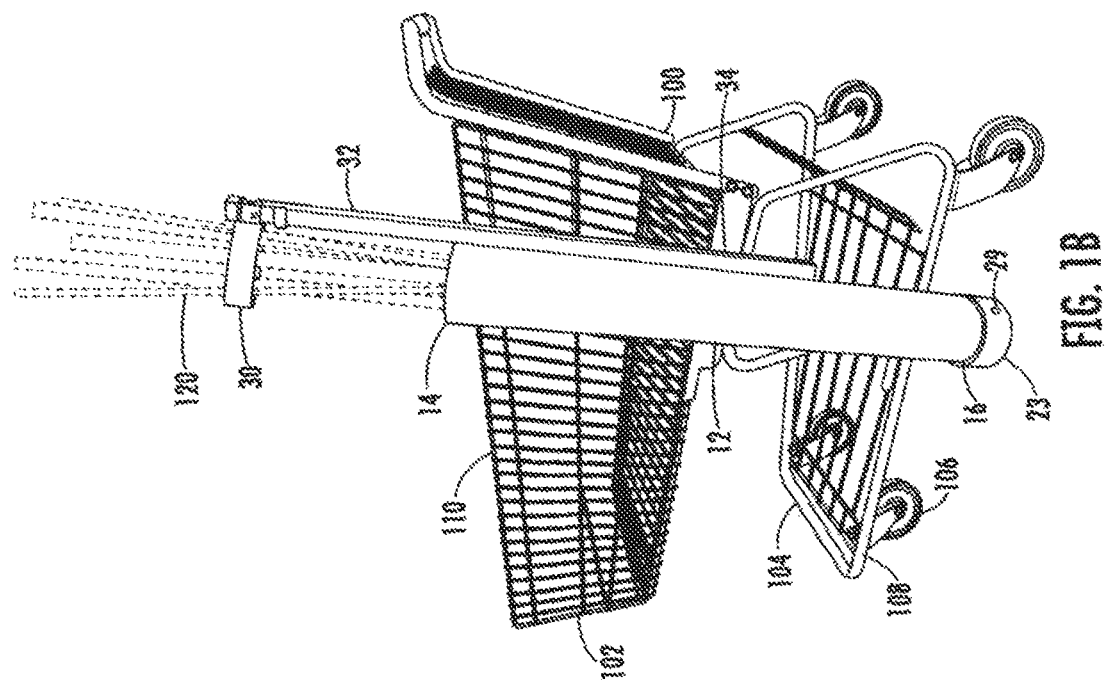
FIG. 1B is a perspective view of the device attached to a shopping cart with the ring member extended.
Figure 1B:
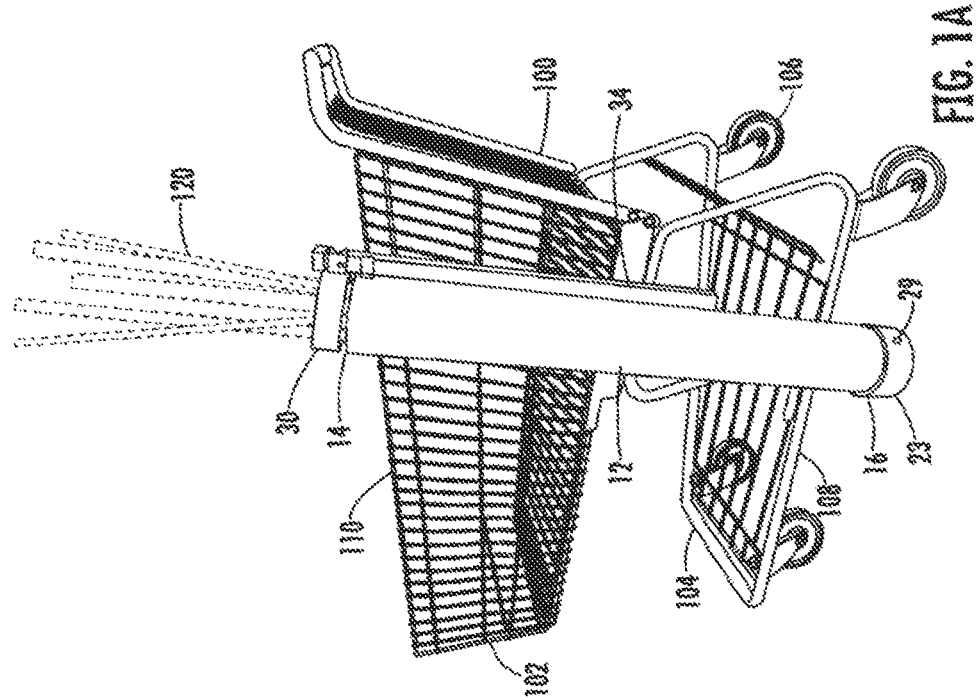
Figure 2:
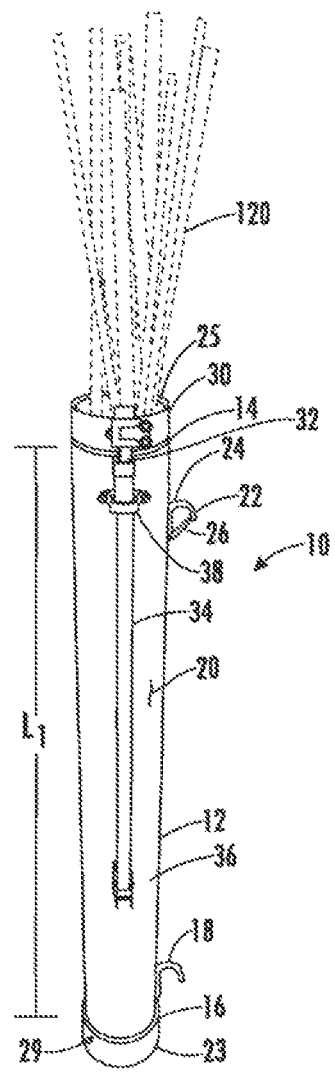
FIG. 2 is an isometric view of the device with the ring member in a retracted position.

Referring now to FIGS. 1A, 1B and 2, illustrated is the cart extender 10 of the instant invention for use with a conventional shopping cart 100. The conventional shopping cart 100 is illustrated having a basket 102 supported by a frame 104 having a set of wheels 106 for ease of maneuvering. The cart extender 10 is formed from a tubular shaped base member 12 having a length L1 with a proximal end 14 and a distal end 16. The proximal end 14 is open and the distal end 16 is capped 23, forming a receptacle 25 therebetween. The base member 12 is preferably constructed from aluminum or PCV pipe. A hook member 18 is secured to an outer surface 20 of the base member 12 along the distal end 16. The hook member 18 is U-shaped and arranged to rest on a lower frame rail 108 of the shopping cart 100, see also FIG. 6. The hook member 18 operates in conjunction with a clasp member 22 which is secured to the outer surface 20 of the base member 12 along the proximal end 14. The clasp member 22 is preferably a clamp 24 having a biasing lever 26 that allows the clasp member to positively secure to an upper edge 110 of the shopping cart basket 100, see also FIG. 7. The clasp member 22 allows ease of positioning of the base member 12 to the cart 100 by simply pushing the biasing lever 26 against the wire frame of the basket 102 and resting the hook member 18 over the lower frame rail 108. For removal, the biasing lever 26 is depressed, wherein the base member 12 can be lifted from the basket 102 attachment. No tools are needed for attachment or removal of the cart extender 10.

The distal end 16 includes a cap 23 coupled thereto, forming the receptacle 25, which is accessible through the open end along the proximal end 14. Long items 120, such as corner beads, copper tubing, plastic tubing, electrical conduit, steel rebar, molding, broom handles, paint brush extension handles and the like are placed in the receptacle 25. A drainage hole 29 can be placed in the cap 23 to allow moisture removal should the cart extender 10 be left in the rain.

Figure 3:
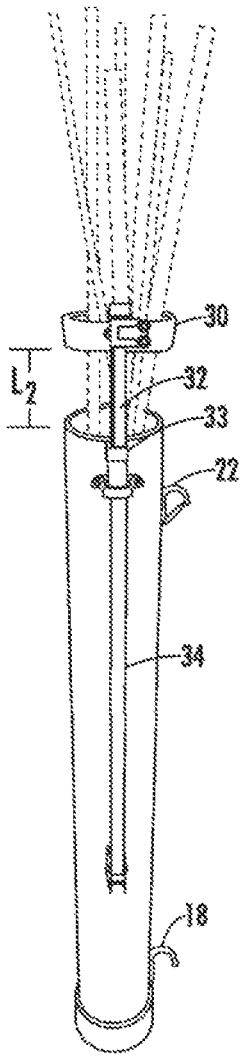
FIG. 3 is an isometric view of the device with the ring member in a partially extended position.
Figure 4:
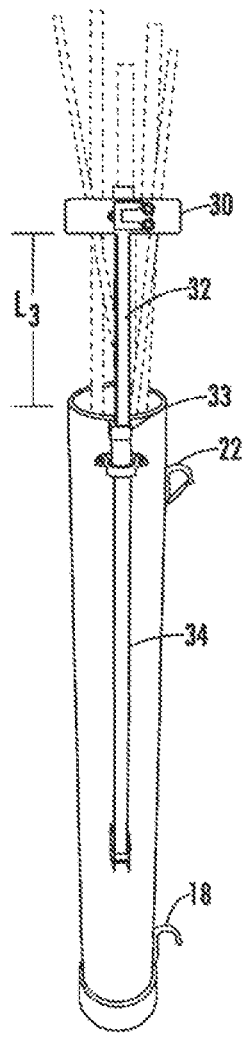
FIG. 4 is an isometric view of the device with the ring member in a further extended position.
Figure 5:
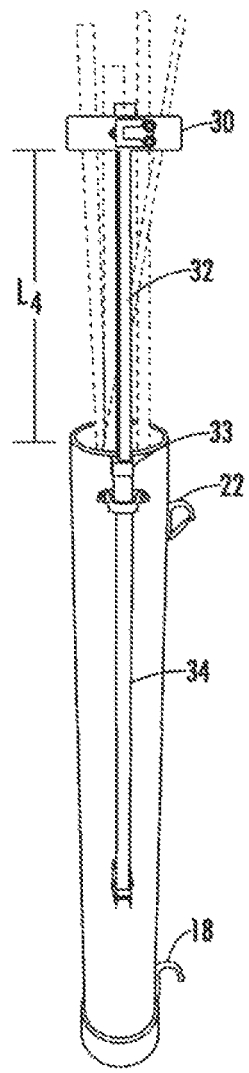
FIG. 5 is an isometric view of the device with the ring member in a fully extended position.

A telescopic ring member 30 is secured to the base member 12 by a slidable rod 32 that fits within a sleeve 34. The sleeve 34 is attached to the base member 12 along a first end 36 near the distal end 16 and along a second end 38 along the proximate end 14. The slidable rod 32 is retracted, wherein the ring member 30 is placed in a retracted position adjacent to the proximal end 14 as illustrated in FIG. 1A, and in an extended position as illustrated in FIG. 1B. FIG. 3 illustrates the ring member 30 in a partially extended position depicted by length L2. FIG. 4 illustrates the ring member 30 in a partially extended position depicted by length L3. FIG. 4 illustrates the ring member 30 in a partially extended position depicted by length L4. The slidable rod 32 fits within the sleeve 34 having a friction tip 33 that maintains the rod 32 in a position once the ring member 30 is extended to a desired position. For example, a full extension of the ring member 30 would be used for rebar, corner beads and the like. A partial extension of the ring member 30 would be used for broom handles or like length items.

Figure 8:
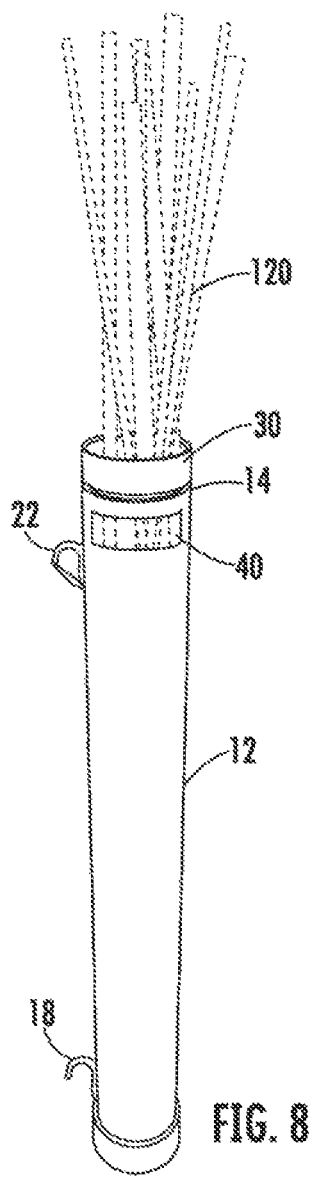
FIG. 8 is an isometric view of the device with a hand hold.

Referring to FIG. 8, illustrated is an embodiment having a handle formed by use of an aperture 40 positioned beneath the proximal end 14. The aperture 40 allows ease of installation and removal of the cart extender 10, wherein an individual's fingers are insertable into the aperture 40 for ease of holding the cart extender 10.

Figure 9:
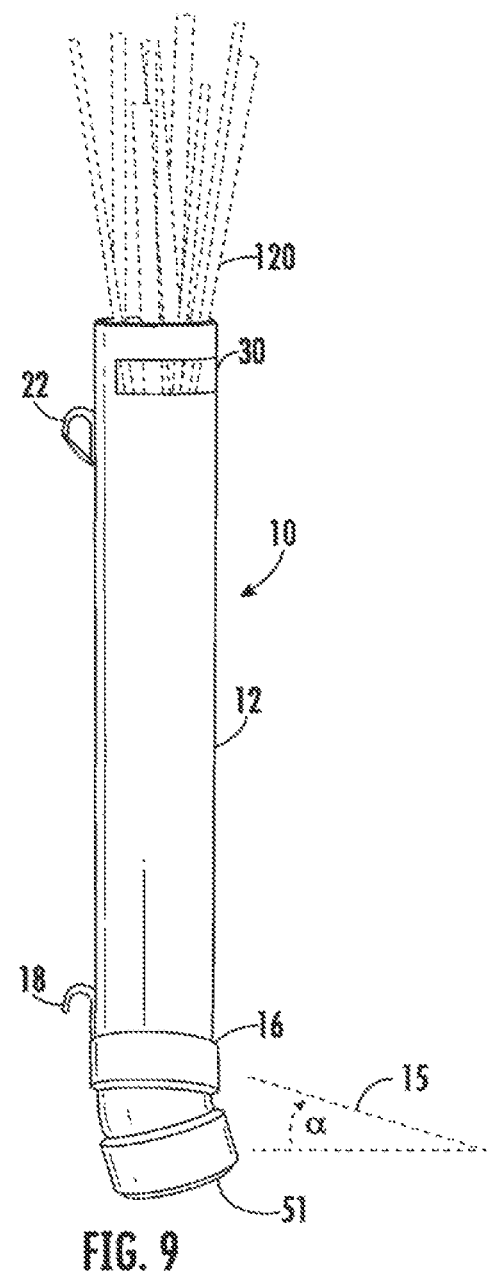
FIG. 9 is an isometric view of the device with an angle sleeve.

FIGS. 9-11 illustrate the cart extender 10 employing an angle sleeve 50 positioned along the distal end 16 of the base member 12. The angle sleeve 50 is attached to the base member 12 with a cap 52 coupled thereto to form the receptacle 25. A drainage hole, similar to the above mentioned embodiment, allows for water drainage should the cart extender 10 be left outside in the rain. The bottom edge of the angle sleeve 50 forms a 45 degree angle 15 to the ground 130, wherein the shopping cart 100 is stopped from tilting more than 10 inches before the angle sleeve 50 impacts the ground 130 and prevents the shopping cart 100 from tipping over. Such a provision is beneficial when a consumer inadvertently places excessive weight into the cart extender 10 and insufficient items are placed into the basket to provide a counterbalance weight. For instance, placing a bundle of rebar into the receptacle would cause a weight imbalance.

The term "coupled" is defined as connected, although not necessarily directly, and not necessarily mechanically. The use of the word "a" or "an" when used in conjunction with the term "comprising" in the claims and/or the specification may mean "one," but it is also consistent with the meaning of "one or more" or "at least one."

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. Furthermore, a device or structure that is configured in a certain way is configured in at least that way, but may also be configured in ways that are not listed.

It is to be understood that while a certain form of the invention is illustrated, such as the hook member and clasp member, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A cart extender for use with a shopping cart, said cart extender comprising:

a base member having a length with a proximal end and a distal end, said proximal end forming an opening and said distal end closed, forming a receptacle therebetween;

a hook member secured to an outer surface of said base member along said distal end, said hook member constructed and arranged to rest on a lower rail of the shopping cart;

a clasp member secured to an outer surface of said base member along said proximal end, said clasp member constructed and arranged to attach to an upper rail of the shopping cart;

a ring member positioned over said proximal end, said ring member telescopic by attachment to a rod operatively associated with a sleeve, wherein said ring member is extendable from a retracted position adjacent said proximal end to a position extending outwardly therefrom;

wherein said base member is attached to the side of a shopping cart by use of said hook member and said clasp member, whereby said receptacle is available for receipt of long items and said ring member forms an opening for passage of the long items and is extendable for those items that require additional securement.

2. The cart extender according to claim 1 wherein said base member is up to six inches in diameter.

3. The cart extender according to claim 1 wherein said distal end includes at least one drain hole for removal of water.

4. The cart extender according to claim 1 wherein said distal end includes an angle sleeve that extends below a lower rail on a shopping cart, wherein said angle sleeve is constructed and arranged to engage the ground surface should the receptacle be overfilled to prevent the shopping cart from tipping over.

5. The cart extender according to claim 1 wherein said rod is slidably inserted into said sleeve, said sleeve including a friction tip that maintains said rod in position once the ring member is extended to a desired position.

6. The cart extender according to claim 1 wherein said base member includes an aperture, wherein said aperture is constructed and arranged to receive an individual's fingers for ease of holding the cart extender.

7. The cart extender according to claim 1 wherein said base member is constructed from aluminum.

8. The cart extender according to claim 1 wherein said base member is constructed from PVC.

\* \* \* \* \*